United States Patent Office 3,481,980
Patented Dec. 2, 1969

3,481,980
PROCESS AND INTERMEDIATES FOR N-[4-(2-ALKYLAMINOALKOXY) - BENZYL] - 3,4-DI-ALKOXY BENZAMIDES
Sidney Teitel, Clifton, N.J., and Moses Wolf Goldberg, deceased, late of Upper Montclair, N.J., by Regina Hauser Goldberg, executrix, Upper Montclair, N.J., assignors to Hoffmann-La Roche Inc., Nutley, N.J., a corporation of New Jersey
No Drawing. Original application Aug. 10, 1964, Ser. No. 389,516, now Patent No. 3,362,993, dated Jan. 9, 1968. Divided and this application Nov. 13, 1967, Ser. No. 682,664
Int. Cl. C07c 103/02, 103/30; A61k 27/00
U.S. Cl. 260—559                3 Claims

ABSTRACT OF THE DISCLOSURE

Novel antiemetic N-[4-(2-alkylaminoalkoxy)-benzyl]-3,4-dialkoxy benzamides, including intermediate compounds, are prepared inter alia by reacting 4-hydroxybenzylamine with a dialkoxy substituted benzoyl halide, etherifying with an N-benzyl-N-lower alkyl amino alkyl halide and either catalytically debenzylating the reaction product or reacting the reaction product with an alkyl halo formate, and hydrolyzing the resulting product. Alternate procedures utilize as a starting material N-(4-hydroxybenzyl)benzamide or the reaction product formed by 4-hydroxybenzaldehyde and an N-benzyl-N-lower alkylamino alkyl halide.

CROSS-REFERENCES TO RELATED APPLICATIONS

This is a division of U.S. patent application Ser. No. 389,516, filed Aug. 10, 1964, now U.S. Patent 3,362,993.

SUMMARY OF THE INVENTION

This invention relates to the preparation of antiemetic compounds of the formula

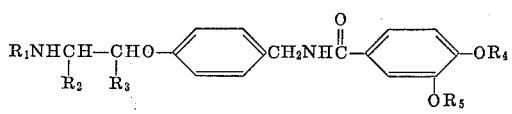

wherein $R_1$, $R_4$ and $R_5$ are lower alkyl and $R_2$ and $R_3$ are selected from the group consisting of hydrogen and lower alkyl, except that at least one of $R_2$ and $R_3$ must be hydrogen by a process which comprises the steps of
(a) reacting a compound of the formula

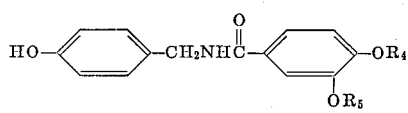

with a compound of the formula

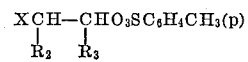

to form a compound of the formula

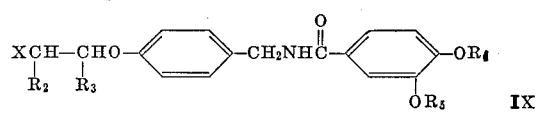

and
(b) reacting said compound of formula IX with an amine of the formula $$R_1NH_2$$

to form a compound of Formula I; wherein the above compounds $R_1$, $R_2$, $R_3$, $R_4$ and $R_5$ have the same meaning as in formula I and X is a halogen atom selected from the group consisting of chlorine, bromine and iodine.

In another aspect, the invention relates to compounds of the Formula IX.

DETAILED DESCRIPTION OF THE INVENTION

The novel substituted benzamides of the invention have the formula

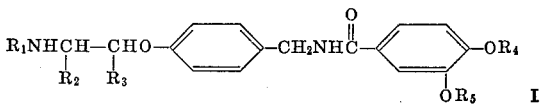

wherein $R_1$ is lower alkyl, preferably methyl; $R_2$ is hydrogen or lower alkyl, preferably hydrogen; $R_3$ is hydrogen or lower alkyl, preferably hydrogen; $R_4$ is lower alkyl, preferably ethyl; and $R_5$ is lower alkyl, preferably ethyl; except that at least one of $R_2$ and $R_3$ must be hydrogen.

Preferred compounds within the above formula are N-[4-(2-methylaminoethoxy)-benzyl]-3,4 - diethoxybenzamide, and a mixture of N-[4-(2-methylamino-1-methylethoxy)-benzyl]-3,4-diethoxybenzamide and N - [4 - (2-methylamino-2-methylethoxy)-benzyl]-3,4 - diethoxybenzamide.

Acid addition salts of the compounds of formula I with pharmaceutically acceptable acids are also within the scope of the invention, and in fact, the preferred compounds named above are usually employed in the form of their hydrochloride salts. The novel compounds of the invention of formula I above can be prepared by a number of procedures which are also within the scope of the invention. The procedures that can be employed are as follows. In the following flowsheets $R_1$ through $R_5$ have the same meaning as in formula I, X represents halogen, specifically iodine, bromine, or chlorine, with bromine and chlorine preferred, and $R_6$ is hydrogen, lower alkyl, lower alkoxy, or carboxy lower alkyl.

METHOD A

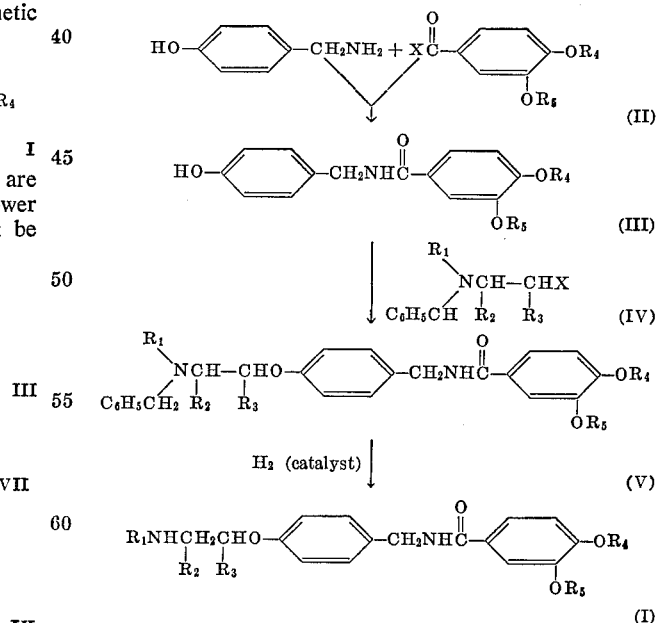

The above reaction scheme is carried out by reacting 4-hydroxybenzylamine with a dialkoxy substituted benzoyl halide of Formula II to give the correspondingly substituted N-(4-hydroxybenzyl)-benzamide of Formula III. The reaction conditions are those commonly employed in the Schotten-Baumann reactions, i.e., simultaneous addition of the dialkoxy substituted benzoyl halide and aqueous alkali to a vigorously stirred mixture of a solvent, e.g., ethylene chloride and water, containing the 4-hydroxybenzylamine so as to maintain slightly alakline reaction conditions.

The benzamide of Formula III is then etherified with an N-benzyl-N-lower alkylaminoalkyl halide of Formula IV, or a mixture of compounds of Formula IV wherein $R_2$ is lower alkyl in one component of the mixture and $R_3$ is lower alkyl in the other component of the mixture, to form a compound of Formula V, or a mixture of compounds of Formula V. This step is carried out under the following conditions: The benzamide of Formula III is converted into its alkali metal salt, preferably the sodium salt, by reaction with an alkali metal lower alkoxide. The alkali metal salt of the benzamide of Formula III is then reacted with the halide of Formula IV in a non-polar organic solvent, e.g., hydrocarbon solvents, halogenated hydrocarbon solvents, etc.

The compound of Formula V is then treated with a strong acid, e.g., with a mineral acid, e.g., hydrochloric acid or hydrobromic acid, in alcohol or aqueous alcohol, acetic acid, etc., and catalytically debenzylated with hydrogen in the presence of a noble metal catalyst, e.g., a palladium or a platinum catalyst or nickel catalyst, e.g., Raney nickel, to give the compound of Formula I, or a mixture of compounds of Formula I. When a mixture of compounds of Formula I is obtained, the mixture is optionally separated into its two components, either by fractional crystallization or by chromatography.

METHOD B

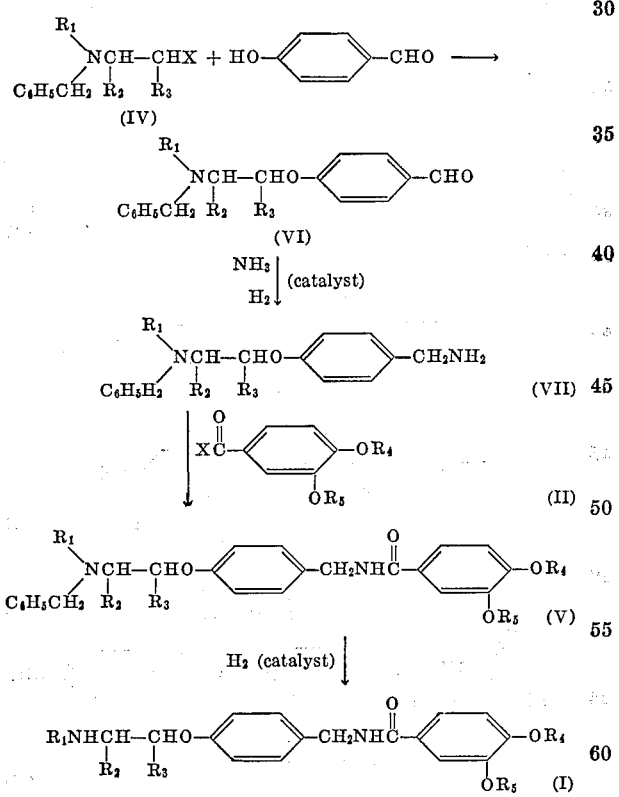

In the process of Method B, an N-benzyl-N-lower alkylaminoalkyl halide of Formula IV is reacted with 4-hydroxybenzaldehyde to form an N-benzyl-N-lower alkylaminoalkoxybenzaldehyde of Formula VI. The lattter subsituted benzaldehyde of Formula VI is then reductively condensed with ammonia in a lower alkanol, preferably ethanol, and hydrogen in the presence of a hydrogenation catalyst such as a noble metal catalyst, e.g., platinum, palladium, etc. or nickel, to give the corresponding diamine of formula VII. The diamine of Formula VII is then reacted with a dialkoxy-substituted benzoyl halide of Formula II to give the compound of Formula V. The compound of Formula V is then cata-lytically debenzylated to a compound of Formula I according to the procedure given in Method A above. It is to be understood that where compounds of Formula IV are employed, where $R_2$ is hydrogen and $R_3$ is lower alkyl or where $R_2$ is lower alkyl and $R_3$ is hydrogen, mixtures of subsequent products VII, V, and I will be obtained. Separation of mixtures of Formula I is carried out according to the procedures given in Method A.

METHOD C

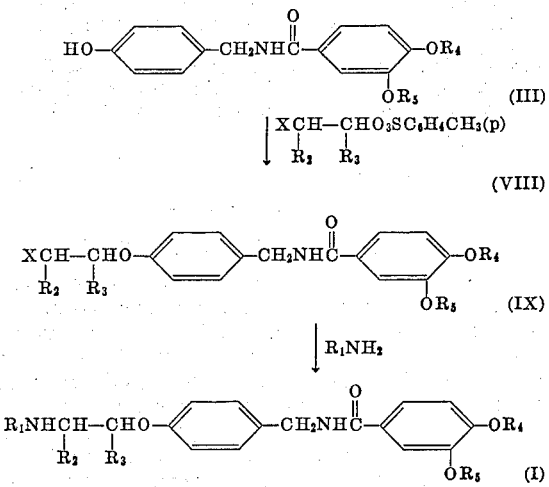

In Method C above, an N-(4-hydroxybenzyl)-benzamide of Formula III is reacted with a haloalkyl-p-toluenesulfonate of Formula VIII to form an N-(halo alkoxybenzyl)amide of Formula IX. The compound of Formula IX is then reacted with a primary amine to give a compound of Formula I (or mixture of compounds of Formula I). In the above reaction scheme, when compounds of Formula IX and Formula I are desired wherein $R_2$ and $R_3$ are hydrogen, an alkylene dihalide such as ethylene dibromide, dichloroide or diiodide can be employed in place of the compound of Formula VIII.

The etherification of the compound of Formula III with the compound of Formula VIII is preferably carried out according to the preferred procedure given for Method A. However, where an alkylene dihalide is employed, it is preferred to add the latter compound to a refluxing solution of the potassium salt of the benzamide of Formula III in methanol.

The reaction of a compound of Formula IX with a primary amine is preferably carried out in methanol containing a trace of sodium iodide, at a temperature of about 100° C.

METHOD D

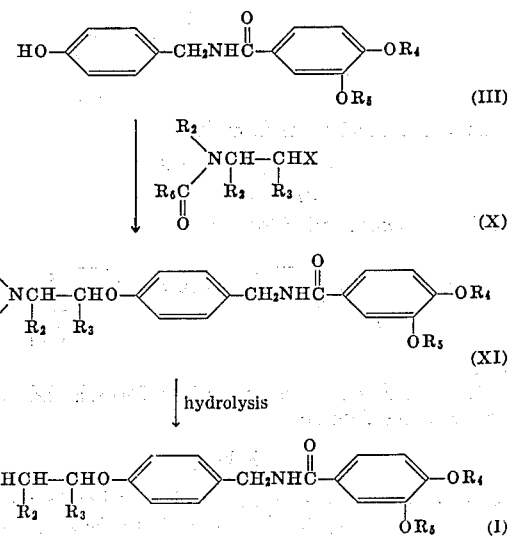

In Method D above, a compound of Formula III is reacted with a halo amide of Formula X to form a compound of Formula XI. The compound of Formula XI is then hydrolyzed with either aqueous acid or base, e.g., an aqueous mineral acid or aqueous alkali to form a compound of Formula I. The preferred process for the preparation of a compound of Formula XI is that given for the preferred etherification process of Method A, i.e., reacting the sodium salt of the benzamide of Formula III with a halo amide of Formula X in refluxing chlorobenzene. Also, when the halo amide of Formula X is a chloroamide, a trace of sodium iodide is preferably added to the reaction mixture.

The hydrolysis of the compound of Formula XI is preferably carried out by refluxing an ethanol solution of the compound of Formula XI with about 2.5 parts of 48 percent hydrobromic acid for 24 hours. Neutralization of the reaction mixture gives the compound of Formula I.

METHOD E

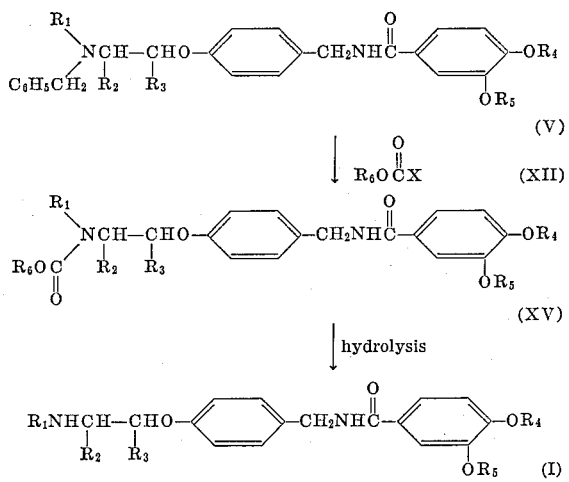

In Method E, a compound of Formula V prepared by Methods A or B is reacted with an alkyl haloformate of Formula XII to form a urethan derivative of Formula XV. The urethan derivative of Formula XV is then hydrolyzed according to the procedure given above for Method D to form a compound of Formula I.

The preferred procedure for reacting the compound of Formula V with an alkyl haloformate of Formula XII is by dissolving the compound of Formula V in refluxing benzene and adding thereto ethyl chloroformate. The resulting urethan derivative of Formula XV is then dissolved in 32 percent hydrobromic acid in acetic acid, and stored at room temperature overnight to form the compound of Formula I.

The term "lower alkyl" and the lower alkyl portion of "lower alkoxy," "lower carboxyalkyl" etc. used in the specification and calims is to be understood to include alkyl groups having from 1 to 7 carbon atoms which can be straight or branched chain, e.g., methyl, ethyl, propyl, butyl, isopropyl, tertiary butyl, hexyl, heptyl, etc.

In the above reaction schemes some or all of the compounds within the scope of Formulas II, IV, VIII, and X are novel. Methods for the preparation of these intermediates are as follows:

Compounds of Formula II can be prepared by treating the corresponding acid with a 5-fold excess of thionyl chloride in refluxing benzene. Removal of the excess thionyl chloride via distillation leaves as the residue the desired acid chlorides of Formula II of sufficient purity to be used directly. The alkoxy substituted benzoic acids are either obtained by oxidation of the corresponding alkoxy substituted benzaldehydes or by etherification of the appropriate hydroxybenzoic acids.

Compounds of Formula IV are obtained by reacting thionyl chloride with the appropriate N-benzyl-N-alkyl-amino alkanol. The latter are obtained by either reacting a benzyl alkylamine with an alkylene oxide or reductively condensing benzaldehyde with an alkylamino alkanol or alkylating a benzylamino alkanol.

Compounds of Formula X are obtained by reacting an acyl halide with an N-(2-haloalkyl)alkylamine hydrochloride. The latter is obtained from the corresponding alkylamino alkanol and thionyl chloride. Alternatively, the appropriate alkylamino alkanol is reacted with formamide to give the N-formyl-N-methylamino alkanol which upon reaction with thionyl chloride gives compounds of Formula X where $R_6$ is hydrogen.

The novel substituted benzamides of the invention are useful as antiemetics, for example, for the suppression of nausea associated with gastrointestinal disturbances, motion sickness, or pregnancy, or induced by the administration of other therapeutic agents. They exhibit a surprisingly high antiemetic activity. They can be employed in the usual pharmaceutical forms, such as in oral unit dosage forms, with typical oral dosages in the range of 10 to 250 mg. Other examples of pharmaceutical forms that can be employed include injectable solutions and suppository dosage forms. The dosage forms are prepared in the usual manner by combining therapeutic doses with conventional carriers and/or excipients according to techniques well known to the pharmaceutical compounding art.

EXAMPLE 1

Preparation of N-[4-(2-methylaminoethoxy)benzyl]-3,4-dimethoxybenzamide hydrochloride To a stirred and refluxing suspension of 10.7 g. (0.059 mole) of veratric acid (previously dried overnight at 60° C. in vacuo) in 75 ml. of dry benzene is added over ½ hour 40 ml. (65.5 g., 0.55 mole) of thionyl chloride. The mixture is stirred and refluxed for an additional 2 hours and the resulting solution taken to dryness with a water vacuum pump and steam temperature. The solid residue is dissolved in 75 ml. of dry benzene and the volatile components distilled off. The benzene treatment is repeated again. To the resulting solid dissolved in 100 ml. of acetonitrile with stirring and refluxing is added over ½ hour a solution of 18 g. (0.057 mole) of 4-(2-benzylmethylaminoethoxy)benzylamine carbonate complex to give N - [4 - (2 - benzylmethylaminoethoxy)benzyl] - 3,4-dimethoxybenzamide, melting point 89–91° (from benzene-petroleum ether).

To 9.55 g. (0.022 mole) of N-[4-(2-benzylmethylaminoethoxy)benzyl]-3,4-dimethoxybenzamide suspended in 200 ml. of water is added 22 ml. of 1 N hydrochloric acid. The resulting pale yellow solution is lyophilized, the residue dissolved in 150 ml. of ethanol and hydrogenated at 25° and 100 p.s.i. above theory using 2 g. of 10 percent palladium-on-carbon. The catalyst is filtered off, the filtrate concentrated in vacuo and the residue crystallized from ethanol to give 7.5 g. of N-[4-(2-methylaminoethoxy)benzyl]-3,4-dimethoxybenzamide hydrochloride, melting point 183–185° C.

The 4-(2-benzylmethylaminoethoxy)benzylamine carbonate complex employed above is prepared as follows: To a stirred suspension of 24.4 g. (0.2 mole) of 4-hydroxybenzaldehyde (practical) in 200 ml. of chlorobenzene is added, all at once, 48 ml. of a 25 percent solution (by weight) of sodium methoxide in methanol (equivalent to 0.21 mole of sodium methoxide). The mixture becomes slightly warm with momentary solution, and then changes to a pink colored suspension. The mixture is stirred and refluxed for 2 hours and then the methanol is slowly distilled off until the vapor temperature is constant (about 165 ml. of distillate is collected). To the stirred and refluxing yellow colored suspension is added in portions over a 45 minute period a solution of 2-benzylmethylaminoethyl chloride in chlorobenzene prepared as follows: [to 46.2 g. (0.2 mole) of 2-benzylmethylaminoethyl chloride hydrochloride dissolved in 50 ml. of water is added 100 ml. of chlorobenzene. To the vigorously stirred mixture while maintaining the temperature at 4° C. is added 75 ml. of 50 percent sodium hydroxide. The upper chlorobenzene extract is quickly decanted from the residual highly alkaline viscous aqueous phase. The latter is re-extracted with two 100 ml. portions of chlorobenzene. The chlorobenzene extracts are combined and rapidly dried over anhydrous potassium carbonate, filtered, and stored at 4° C., and then used as disclosed above.]

After the addition is completed, the reaction mixture is stirred and refluxed for 20 hours, cooled and the precipitate that forms is filtered off. The yellow colored filtrate is washed with four 50 ml. portions of water, dried over anhydrous sodium sulfate, filtered, and concentrated at water vacuum and steam temperature to give 51 g. of an orange colored oil. This is fractionally distilled in high vacuum to give 40.8 g. of N-[2-(N-benzylmethylaminoethoxy]-benzaldehyde.

To 179 g. (0.67 mole) of N-[2-(N-benzylmethylamino) ethoxy]-benzaldehyde dissolved in 200 ml. of ethanol is added 350 ml. of 13 percent ammonia (2.7 mole) in ethanol. The yellow colored solution is stored at 4° C. overnight and then hydrogenated at 100° and 400 p.s.i. using 6 tsp. of Raney nickel. The catalyst is filtered off and the volatile components distilled off at water vacuum and steam temperature to give 175 g. of a yellow colored residual oil. The latter oil is dissolved in 900 ml. of anhydrous ether and at 4° C. is treated with carbon dioxide until no further precipitation occurs. The white amorphous precipitate that forms is filtered off, washed with petroleum ether (30–60°) and dried in vacuo to give 156 g. of 4-(2-benzylmethylaminoethoxy)benzylamine carbonate complex.

EXAMPLE 2

Preparation of N-[4-(2-methylaminoethoxy)benzyl]-4-ethoxy-3-methoxybenzamide hydrochloride To a stirred and refluxing solution of 16.5 g. (0.084 mole) of 4-ethoxy-3-methoxybenzoic acid (previously dried over phosphorous pentoxide) in 400 ml. of dry benzene is added over ½ hour 25 ml. of thionyl chloride. After stirring and refluxing for an additional 2 hours the resulting solution is taken to dryness using a water vacuum and steam temperature. The residue is dissolved in 100 ml. of dry benzene and the volatile components distilled off. The benzene treatment is repeated. The residue, crude 4-ethoxy-3-methoxybenzoyl chloride, is dissolved in 200 ml. of methylene chloride and the solution stored in a nitrogen atmosphere until used below.

To 12.7 g. (0.08 mole of 4-hydroxybenzylamine hydrochloride dissolved in 50 ml. of water, is added 100 ml. of methylene chloride. To the vigorously stirred mixture at 4°, blanketed with nitrogen and adjusted to pH 7.5 to 8 with 15 percent sodium hydroxide, is added the above solution of 4-ethoxy-3-methoxybenzoyl chloride over a 1½ hour period. Simultaneous addition of 15 percent sodium hydroxide is made as needed to maintain pH 7.5 to 8. A precipitate forms. The resulting mixture is stirred at 4° for an additional hour and then 3 N hydrochloric acid is added to pH 5 to 6. The resulting crystals are filtered off, washed with water, and recrystallized from acetone-water to give 18.1 g. of 4-ethoxy-N-(4-hydroxybenzyl) - 3 - methoxybenzamide, melting point 157–158° C.

31.5 g. (0.099 mole) of 4-ethoxy-N-(4-hydroxybenzyl)-3-methoxybenzamide in 500 ml. of chlorobenzene and 25.8 ml. of a 25 percent solution of sodium methoxide (by weight) in methanol (equivalent to 0.011 mole of sodium methoxide) is treated with a 600 ml. chlorobenzene solution of 2-benzylmethylaminoethyl chloride, derived from 33.2 g. (0.143 mole) of 2-benzylmethylaminoethyl chloride hydrochloride to give 29 g. of N-[4 - (2 - benzylmethylaminoethoxy)benzyl] - 4 - ethoxy-3-methoxybenzamide, melting point 82–84° C. (from acetone-ether-petroleum ether).

5.6 g. (0.0125 mole) of N - [4 - (2 - benzylmethylaminoethoxy) - benzyl] - 4 - ethoxy - 3 - methoxybenzamide is converted to its hydrochloride with ethanolic hydrogen chloride and reduced in ethanol with 1 g. of 10 percent palladium-on-carbon to give 2.5 g. of N-[4-(2 - methylaminoethoxy)benzyl] - 4 - ethoxy - 3 - methoxybenzamide hydrochloride, melting point 171–173° C. (from acetonitrile-ether).

EXAMPLE 3

Preparation of N - [4 - (2 - methylaminoethoxy)benzyl]-3 - methoxy - 4 - propoxybenzamide hydrochloride 15 g. (0.072 mole) of 3-methoxy-4-propoxybenzoic acid is treated with 21 ml. of thionyl chloride according to the process of Example 1 to form 3-methoxy-4-propoxybenzoyl chloride. The latter compound is then reacted with 10.5 g. (0.066 mole) of 4-hydroxybenzylamine hydrochloride according to the process of Example 2 to give 14.3 g. of N-(4-hydroxybenzyl)-3-methoxy-4-propoxybenzamide, melting point 174–175° C. (from acetone-water).

22 g. (0.07 mole) of the latter compound in 500 ml. of chlorobenzene and 17.2 ml. of a 25 percent solution of sodium methoxide (by weight) in methanol (equivalent to 0.075 mole of sodium methoxide) is treated with a 300 ml. chlorobenzene solution of 2-benzylmethylaminoethyl chloride derived from 22.2 g. (0.096 mole) of 2-benzylmethylaminoethyl chloride hydrochloride gives 21 g. of N-[4-(2-benzylmethylaminoethoxy)benzyl]-3-methoxy-4-propoxybenzamide, melting point 68–70° (from acetonitrile) according to the process of Example 2.

13 g. (0.028 mole) of the latter compound is converted to its hydrochloride addition salt with ethanolic hydrogen chloride and reduced in ethanol with 3 g. of 10 percent palladium-on-carbon according to the process of Example 1 to give 8.6 g. of N-[4-(2-methylaminoethoxy)benzyl] - 3 - methoxy - 4 - propoxybenzamide hydrochloride, melting point 180–182° C. (from water-ethanol-ether).

EXAMPLE 4

Preparation of N - [4 - (2 - methylaminoethoxy)benzyl]-3,4 - diethoxybenzamide hydrochloride

A. VIA BENZYL INTERMEDIATE

*Procedure A.*—To a stirred and refluxing solution of 70 g. (0.33 mole) of 3,4-diethoxybenzoic acid, previously dried overnight at 60° in vacuo, in 500 ml. of dry benzene is added over 1¾ hours 96 ml. (157 g., .132 mole) of thionyl chloride. After stirring and refluxing for an additional 2 hours, the volatile components are distilled off at water vacuum and steam temperature. The residual brown colored oil is dissolved in 250 ml. of dry benzene and the volatile components are once again distilled off. The benzene treatment is repeated once again to give a residual tan colored solid containing a trace of oil. This crude 3,4-diethoxybenzoyl chloride is dissolved in 400 ml. of methylene chloride and the solution stored in a nitrogen atmosphere at room temperature until used.

To 49.5 g. (0.31 mole) of 4-hydroxybenzylamine hydrochloride dissolved in 250 ml. of water is added 500 ml. of methylene chloride. To the vigorously stirred mixture at 4° C., blanketed with nitrogen and adjusted to pH 7.5 to 8.0 with about 90 ml. of 15 percent sodium hydroxide is added the above solution of 3,4-diethoxybenzoyl chloride over a 4 hour period. Simultaneous addition of 15 percent sodium hydroxide is made as required to maintain pH 7.5 to 8.0. Crystals form during the reaction. The resulting viscous mixture is stirred for an additional hour at 4° C. and then 3 N hydrochloric acid is added to pH 5 to 6. The tan colored crystals are filtered off, washed with water and dried in vacuo at 60° C. to give 98 g. of 3,4-diethoxy-N-(4-hydroxybenzyl)benzamide, melting point 182–185° C. Upon recrystallization from acetone-ether, the melting point is 183–185° C.

To a stirred suspension of 60 g. (0.19 mole) of 3,4-diethoxy-N-(4-hydroxybenzyl)benzamide in 1500 ml. of chlorobenzene is added 45 ml. of a 25 percent solution (by weight) of sodium methoxide in methanol (equivalent to 0.20 mole of sodium methoxide). The suspension is stirred and refluxed for 2 hours. The methanol is slowly distilled off until the vapor temperature is constant (about 135 ml. of distillate is collected). To the residual colored suspension while stirring and refluxing is added over 2 hours a solution of 2-benzylmethylaminoethyl chloride in chlorobenzene prepared from 55 g. (0.25 mole) of 2-benzylmethylaminoethyl chloride hydrochloride according to the procedure of Example 1. After the addition is completed, the reaction mixture is stirred and refluxed for 20 hours, cooled and filtered. To the filtrate is added 300 ml. of water and the pH adjusted to 12 with 15 percent sodium hydroxide. The lower chlorobenzene layer is separated off, washed with four 300 ml. portions of water, dried over anhydrous sodium sulfate, filtered, and concentrated at water vacuum and steam temperature. The residue, consisting of white solids and brown colored oil, is crystallized from a mixture of 175 ml. of benzene, 275 ml. of ether, 1350 ml. of petroleum ether (30–60° C.) to give 74.2 g. of off-white N-[4-(2-benzylmethylaminoethoxy)benzyl] - 3,4 - diethoxybenzamide, melting point 102–104° C.

An aliquot, when treated with oxalic acid in acetone, gives N - [4-(2-benzylmethylaminoethoxy)benzyl]-3,4-diethoxybenzamide oxalate hemihydrate, melting point 137–139° C. (from 95 percent acetonitrile-ether).

Procedure B.—11 g. (0.052 mole) of 3,4-diethoxybenzoic acid is converted to the acid chloride and treated with 15.7 g. (0.05 mole) of 4-(2-benzylmethylaminoethoxy)benzylamine carbonate complex (see Example 1) to give 17.6 g. of N-[4-(2-benzylmethylaminoethoxy)benzyl]-3,4-diethoxybenzamide, melting point 102–104° C. (from benzene-ether-petroleum ether).

To 88 g. (0.19 mole) of N-[4-(2-benzylmethylaminoethoxy)benzyl]-3,4-diethoxybenzamide dissolved in 200 ml. of ethanol is added about 50 ml. of 20 percent hydrogen chloride in ethanol to pH 2. The solution is immediately taken to dryness at water vacuum and steam temperature, the semi-solid residue dissolved in 150 ml. of ethanol and the volatile components distilled off. The residue is dissolved in 600 ml. of ethanol and hydrogenated at 25° and 100 p.s.i. above theory using 20 g. of 10 percent palladium-on-carbon. The catalyst is filtered off and washed with water to dissolve away the crystals that had deposited. The filtrate and washings are combined and the volatile components distilled off. The residue, initially obtained as an oil, crystallizes on standing. It is recrystallized from a mixture of acetonitrile-ether or water-ethanol-ether to give 64 g. of white crystals of N-[4-(2-methylaminoethoxy)benzyl]-3,4 - diethoxybenzamide hydrochloride, melting point 171–173° C. with sintering at 120° C.

An aliquot of the above compound, when dissolved in water and rendered alkaline with ammonium hydroxide, gives a crystalline precipitate. This is filtered off, washed with water, air-dried, and recrystallized from ethanol-water to give N-[4-(2-methylaminoethoxy)benzyl]-3,4-diethoxybenzamide, melting point 119–121° C.

B. VIA CHLORO INTERMEDIATE 15.8 g. (0.05 mole) of 3,4-diethoxy-N-(4-hydroxybenzyl)-benzamide in 500 ml. of chlorobenzene and 11.7 ml. of a 25 percent solution ( by weight) of sodium methoxide in methanol (equivalent to 0.051 mole of sodium methoxide) is reacted according to the process of Example 4 with 11.7 g. (0.05 mole) of 2-chloroethyl-p-toluenesulfonate to give 11.7 g. of N-[4-(2-chloroethoxy) benzyl]-3,4-diethoxybenzamide, melting point 126–128° C. (from acetone-ether).

To 3.8 g. (0.01 mole) of N-[4-(2-chloroethoxy)benzyl]-3,4-diethoxybenzamide dissolved in 20 ml. of methanol is added 150 mg. (0.001 mole) of sodium iodide and 13.5 ml. of 12 percent methylamine in methanol. The solution is heated at 100° C. for 8 hours, the volatile components distilled off and the orange-brown colored oil crystallized from ethyl acetate to give 2.0 g. of unchanged N-[4-(2-chloroethoxy)benzyl]-3,4-diethoxybenzamide. The yellow colored ethyl acetate filtrate is extracted with 1 N hydrochloric acid. The aqueous extract is adjusted to pH 10 with ammonium hydroxide and the crystals that formed are filtered off and air-dried to give 1.4 g. of N-[4-(2-methylaminoethoxy)benzyl]-3,4-diethoxybenzamide, melting point 117–120° C. A mixed melting point with N-[4-(2-methylaminoethoxy)benzyl]-3,4-diethoxybenzamide obtained via the benzyl intermediate (Procedure A, above) gives no depression.

C. VIA SAPONIFICATION

Procedure A.—A solution of 2.2 g. (0.005 mole) of 2 - [4 - (3,4 - diethoxybenzamidomethyl)phenoxy]ethylmethylcarbamic acid ethyl ester in 20 ml. of 32 percent hydrobromic acid in acetic acid is stored at 25° overnight then rendered alkaline with 10 percent sodium hydroxide and extracted with ethyl acetate. The highly colored extract is washed with water and then extracted with 3 N hydrochloric acid. The pale yellow colored acidic aqueous extract is adjusted with conc. ammonium hydroxide to pH 10, and the crystalline precipitate that forms is filtered off, washed with water and air-dried to give 0.5 g. of N-[4-(2-methylaminoethoxy)benzyl]-3,4-diethoxybenzamide, melting point 118–120° C.

2 - [4 - (3,4 - diethoxybenzamidomethyl)phenoxy]ethylmethyl carbamic acid ethyl ester is prepared as follows:

A mixture of 4.6 g. (0.01 mole) of N-[4-(2-benzylmethylaminoethoxy)benzyl]-3,4-diethoxybenzamide and 1.1 ml. (0.011 mole) of ethyl chloroformate (freshly distilled) in 20 ml. of dry benzene is refluxed for 18 hours. The resulting solution is washed first with cold 1N hydrochloric acid, then with water and the volatile components distilled off in vacuo. The residue is crystallized from benzene-ether-petroleum ether to give 3.9 g. of 2 - [4 - (3,4-diethoxybenzamidomethyl)phenoxy]ethylmethyl carbamic acid ethyl ester, melting point 121–122° C.

Procedure B.—To a solution of 0.4 g. (1 millimole) of 3,4-diethoxy - N - {4-[2-(N-methylacetamido)ethoxy]benzyl}-benzamide in 5 ml. of ethanol is added 1 ml. of 48 percent hydrobromic acid. The solution is refluxed for 24 hours, the volatile components distilled off in vacuo and the residue distributed between dilute sodium carbonate and ethyl acetate. The ethyl acetate extract is washed with water and then extracted with 3 N hydrochloric acid. The acidic aqueous layer is rendered alkaline to give 0.16 g. of N-[4-(2-methylaminoethoxy)benzyl]-3,4-diethoxybenzamide, melting point 117–119° C.

3.4 - diethoxy - N-{4-[2-(N-methylacetamido)ethoxy] benzyl}-benzamide is prepared as follows:

5.9 g. (0.019 mole) of 3,4-diethoxy-N-(4-hydroxybenzyl) benzamide in 150 ml. of chlorobenzene and 4.5 ml. of a 25 percent solution of sodium methoxide (by weight) in methanol (equivalent to 0.019 mole of sodium methoxide) is treated, according to the process of Example 2, with 2.7 g. (0.02 mole) of N-chloroethyl)N-methylactamide to give 5.0 g. of 3,4-diethoxy-N-{4-[2-N-methylacetamido)ethoxy]benzyl} - benzamide, melting point 143–145° C.

EXAMPLE 5

Preparation of N-[4-(2-ethylaminoethoxy)benzyl]-3,4-diethoxybenzamide hydrochloride 24.4 g. (0.2 mole) of 4-hydroxybenzaldehyde in 200 ml. of chlorobenzene and 48 ml. of a 25 percent solution (by weight) of sodium methoxide in methanol (equivalent to 0.21 mole of sodium methoxide) is reacted with 47 g. (0.2 mole) of 2-benzylethylaminoethyl chloride hydrochloride according to the process of Example 2 to give 33.3 g. of 4-[2-(benzylethylamino)ethoxy]-benzaldehyde orange colored oil, $b_{0.1}$ 163–167° C., $n_D^{21}$ 1.5721

To 14.2 g. (0.05 mole) of 4-[2-(benzylethylamino)ethoxy]-benzaldehyde, dissolved in 100 ml. of ethanol is added 35 ml. of 13 percent ammonia (ca. 0.25 mole) in ethanol. The yellow colored solution is stored at 4° overnight and then hydrogenated at 100° and 400 p.s.i. using 1 tsp. of Raney nickel. When the hydrogen uptake ceases, the catalyst is filtered off and the volatile components distilled off at water vacuum and steam temperature. The residual oil is dissolved in 150 ml. of anhydrous ether and at 4° is saturated with carbon dioxide. The white amorphous precipitate that forms is filtered off, washed with petroleum ether (30–60°), dissolved in 150 ml. of acetonitrile and used below. According to the procedure of Example 1, 11 g. (0.052 mole) of 3,4-diethoxybenzoic acid is converted to the acid chloride and treated with the above solution of 4-(2-benzylethylaminoethoxy)benzylamine carbonate complex in acetonitrile to give 18 g. of N-[4-(benzyletylaminoethoxy)benzyl]-3,4-diethoxybenzamide, melting point 96–98° C. (from ethyl acetate-ether-petroleum ether).

14 g. (0.029 mole) of N-[4-(2-benzylethylaminoethoxy)benzyl]-3,4-diethoxybenzamide is converted to the hydrochloride addition salt with ethanolic hydrogen chloride and reduced in ethanol with 3 g. of 10 percent palladium-on-carbon according to the procedure of Example 1 to give 11.6 g. of N-[4-(2-ethylaminoethoxy)benzyl]-3,4-diethoxybenzamide hydrochloride, melting point 162–163° C.

EXAMPLE 6

Preparation of N-[4-(2-methylaminoethoxy)benzyl]-4-methoxy-3-propoxybenzamide hydrochloride To 12.8 g. (0.2 mole) of potassium hydroxide (86.5 percent pure), dissolved in 400 ml. of ethanol, are added 30.4 g. (0.2 mole) of isovanillin. To the resulting solution, while stirring and refluxing is added 32.0 g. (0.2 mole) of n-propylbromide over 2 hours. After the addition is completed, the mixture is stirred and refluxed for 14 hours, the volatile components are distilled off and the residue distributed between ether and water. The ether extract is separated off, washed with 5 percent potassium hydroxide, then with water, dried over anhydrous sodium sulfate and filtered. The filtrate is concentrated to a low volume and stored at 4° C. overnight. The crystals that had formed are filtered off and air-dried, to give 31 g. of 4-methoxy-3-propoxybenzaldehyde, melting point 50–52° C.

To a vigorously stirred suspension of 23.2 g. (0.12 mole) of 4-methoxy-3-propoxybenzaldehyde in 350 ml. of water maintained at 90° C., is added over 1½ hour a solution of 34 g. of potassium permanganate in 550 ml. of water. After the addition is completed, the mixture is stirred and refluxed for 1¼ hour, cooled and 15 percent potassium hydroxide added to pH 10. The dark brown solids are filtered off and to the filtrate is added concentrated hydrochloric acid to pH 2. The crystalline precipitate that forms is filtered off and recrystallized from methanol-water to give 21.5 g. of 4-methoxy-3-propoxybenzoic acid, melting point 154–156° C.

19.5 g. (0.093 mole) of 4-methoxy-3-propoxybenzoic acid is treated with thionyl chloride to form the acid chloride according to the procedure of Example 2. This acid chloride is reacted with 13.7 g. (0.086 mole) of 4-hydroxybenzylamine hydrochloride to give 19.8 g. of N-(4-hydroxybenzyl)-4-methoxy-3-propoxybenzamide, melting point 170–172° C. (from ethanol-water).

22 g. (0.07 mole) of N-(4-hydroxybenzyl)-4-methoxy-3-propoxybenzamide in 500 ml. of chlorobenzene and 17.2 ml. of a 25 percent solution of sodium methoxide (by weight) in methanol (equivalent to 0.075 mole of sodium methoxide), when treated with a 250 ml. chlorobenzene solution of 2-benzylmethylaminoethyl chloride, derived from 22.2 g. (0.096 mole) of 2-benzylmethylaminoethyl chloride hydrochloride according to the procedure of Example 2, gives 17.5 g. of N-[4-(2-benzylmethylaminoethoxy)benzyl] - 4 - methoxy - 3 - propoxybenzamide, melting point 124–125° C. (from acetone-ether).

12.5 g. (0.027 mole) of N-[4-(2-benzylmethylaminoethoxy)-benzyl]-4-methoxy - 3 - propoxybenzamide are converted to the hydrochloride salt with ethanolic hydrogen chloride and reduced in ethanol with 3 g. of 10 percent palladium-on-carbon according to the procedure of Example 2 to give 10 g. of N-[4-(2-methylaminoethoxy)benzyl]-4-methoxy - 3 - propoxybenzamide hydrochloride, melting point 158–160° C. (from acetonitrile).

EXAMPLE 7

Preparation of N-[4-(2-methylaminoethoxy)benzyl]-3,4-dipropoxybenzamide hydrochloride 20 g. (0.085 mole) of 3,4-di-n-propoxybenzoic acid are converted to the acid chloride with thionyl chloride according to the process of Example 1 and treated with 25 g. (0.08 mole) of 4-(2-benzylmethylaminoethoxy)benzylamine carbonate complex according to the process of Example 1 to give 24 g. of N-[4-(2-benzylmethylaminoethoxy)benzyl]-3,4 - dipropoxybenzamide, melting point 85–88° C. (from benzene-petroleum ether).

15.2 g. (0.031 mole) of N-[4-(2-benzylmethylaminoethoxy)benzyl]-3,4 - dipropoxybenzamide as the hydrochloric salt is reduced with hydrogen using palladium-on-carbon catalyst according to the procedure of Example 1 to give 11.2 g. of N-[4-(2-methylaminoethoxy)benzyl]-3,4 - dipropoxybenzamide hydrochloride, melting point 189–190° C. (from ethanol-acetone).

EXAMPLE 8

Preparation of N-[4-(2-butylaminoethoxy)benzyl]-3,4-diethoxybenzamide hydrochloride 31.5 g. (0.1 mole) of 3,4-diethoxy-N-(4-hydroxybenzyl)benzamide in 800 ml. of chlorobenzene and 24 ml. of a 25 percent solution of sodium methoxide (by weight) in methanol (equivalent to 0.105 mole of sodium methoxide) is treated with 28.5 g. (0.125 mole) of N-(2-chloroethyl)-N-butylbenzylamine according to the procedure of Example 4 to give 19.6 g. of N-[4-(2-benzylbutylaminoethoxy)benzyl]-3,4-diethoxybenzamide, melting point 60–62° C. (from ether-petroleum ether).

16.1 g. (0.032 mole) of N-[4-(2-benzylbutylaminoethoxy)benzyl] - 3,4 - diethoxybenzamide as its hydrochloride salt is reduced with hydrogen using palladium-on carbon catalyst according to the procedure of Example 1 to give 12.1 g. of N-[4-(2-butylaminoethoxy)benzyl]-3,4-diethoxybenzamide hydrochloride, melting point 197–198° C. (from acetonitrile-ethyl acetate).

EXAMPLE 9

Preparation of N-[4-(2-methylamino-1(and 2) - methylethoxy)benzyl-4-ethoxy - 3 - methoxybenzamide oxalate hemihydrate 15 g. (0.05 mole) of 4-ethoxy-N-(4-hydroxybenzyl)-3-methoxy benzamide in 350 ml. of chlorobenzene and 14.4 ml. of a 25 percent solution of sodium methoxide (by weight) in methanol (equivalent to 0.053 mole of sodium methoxide) is treated with a 250 ml. chlorobenzene solution of N-benzyl-2-chloro-N - methylpropylamine derived from 15.9 g. (0.068 mole) of N-benzyl-2-chloro-N-methylpropylamine hydrochloride according to the procedure of Example 2 to give 11.3 g. of an oil. The latter, as the hydrochloride salt, is reduced with hydrogen according to the procedure given in Example 1 using palladium-on-carbon. The hydrogenation product is rendered alkaline and extracted into ether. The ether extract is washed with water, dried over sodium sulfate, filtered and the filtrate taken to dryness. The residual oil is dissolved in ether and added to a solution of 12 g. of oxalic acid (anhydrous) in 400 ml. of ether. The precipitate that forms is filtered off, washed with ether and crystallized from methanol-acetonitrile-ether to give N-[4-(2-methylamino-1(and 2)-methylethoxy)benzyl] - 4 - ethoxy-3-methoxybenzamide oxalate hemihydrate, melting point 116–118° C. with sintering at 112° C.

EXAMPLE 10

Preparation of N-[4-(2-methylamino-1(and 2) - methylethoxy)benzyl]-4-methoxy-3-propoxybenzamide hydrochloride 18.5 g. (0.059 mole) of N-(4-hydroxybenzyl)-4-methoxy-3-propoxybenzamide in 300 ml. of chlorobenzene and 14.2 ml. of a 25 percent solution of sodium methoxide (by weight) in methanol (equivalent to 0.062 mole of sodium methoxide) is treated with a 400 ml. chlorobenzene solution of N-benzyl-2-chloro-N-methylpropylamine derived from 18.3 g. (0.078 mole) of N-benzyl-2-chloro-N-methyl-propylamine hydrochloride according to the procedure of Example 4 to give 20 g. of N-{4-[2-benzylmethylamino)-1(and 2)methylethoxy]benzyl} - 4-methoxy-3-propoxybenzamide, melting point 63–65° C. (from ether-petroleum ether).

18 g. (0.038 mole) of N-{4-[2-(benzylmethylamino)-1(and 2)-methylethoxy]benzyl} - 4 - methoxy - 3 - propoxybenzamide, as the hydrochloride salt, is reduced with hydrogen and palladium-on-carbon according to the process of Example 1 to give 13 g. of N-[4-(2-methylamino-1(and 2)-methylethoxy)benzyl] - 4 - methoxy - 3 - propoxybenzamide hydrochloride, melting point 155–157° C. (from ethanol-ether).

EXAMPLE 11

Preparation of N-[4-(2-methylamino-1(and 2) - methylethoxy)benzyl]-3,4-diethoxybenzamide hydrochloride 59 g. (0.19 mole) of 3,4-diethoxy-N-(4-hydroxybenzyl)benzamide in 1.5 liter of chlorobenzene and 45 ml. of a 25 percent solution of sodium methoxide (by weight) in methanol (equivalent to 0.198 mole of sodium methoxide), is treated with a solution of N-benzyl-2-chloro-N-methylpropylamine in 1.3 liter of chlorobenzene, derived from 58.6 g. (0.25 mole) of N-benzyl-2-chloro-N-methylpropylamine hydrochloride according to the procedure of Example 4 to give 79.4 g. of N-{4-[2-benzylmethylamine)-1(and 2)-methylethoxy]benzyl}-3,4 - diethoxybenzamide, melting point 52–54° C. (from ether-petroleum ether).

56.3 g. (0.118 mole) of N-{4-[2-benzylamino)-1(and 2) - methylethoxy]benzyl} - 3,4 - diethoxybenzamide as the hydrochloride salt is reduced with hydrogen and palladium-on-carbon according to the process of Example 1 to give 41.5 g. of N-[4-(2-methylamino-1(and 2)-methylethoxy)benzyl] - 3,4 - diethoxybenzamide hydrochloride melting point 156–158° C. (from acetone-ether).

The crystalline free base of N-[4-(2-methylamino-1 (and 2) - methylethoxy)benzyl]-3,4-diethoxybenzamide hydrochloride is obtained by dissolving the above hydrochloride salt in water and adding amonium hydroxide to pH 10. The crystals that form are filtered off and the air-dried to give N-[4-(2-methylamino-1(and 2)-methylethoxy)benzyl]-3,4-diethoxybenzamide, melting point 104–106° C. (from acetone-ether).

Preparation of N-[4-(2-methylamino-2-methylethoxy) benzyl]-3,4-diethoxybenzamide hydrochloride 2 g. of N-[4-(2-methylamino-1(and 2)-methylethoxy) benzyl]-3,4-diethoxybenzamide hydrochloride is recrystallized from 5 ml. of isopropanol and the crystals thus obtained recrystallized twice more from isopropanol to give 0.5 g. of N-[4-(2-methylamino-2-methylethoxy)benzyl]-3,4-diethoxybenzamide hydrochloride, melting point 165–167°. The crystalline free base, obtained as described above, melts 120–122° (from ethyl acetate-ether-petroleum ether).

Preparation of N-[4-(2-methylamino-1-methylethoxy) benzyl]-3,4-diethoxybenzamide hydrochloride 65.5 g. (0.55 mole) of 4-hydroxybenzaldehyde in 600 ml. of chlorobenzene and 131 ml. of a 25 percent solution (by weight) of sodium methoxide in methanol (equivalent to 0.58 mole of sodium methoxide) is reacted with a solution of N-benzyl-2-chloro-N-methyl-propylamine in 1.5 liter of chlorobenzene, derived from 160 g. 0.68 mole) of N-benzyl-2-chloro-N-methylpropylamine hydrochloride according to the process of Example 1 to give 115.5 g. of 4-[2-(benzylmethylamino-1(and 2)-methylethoxy]-benzaldehyde, colorless oil, $b_{0.1}{}^{66°}$, $n_D{}^{26}$ 1.5731. To the latter, dissolved in 600 ml. of ethanol, is added 270 ml. of 13 percent ammonia (ca. 1.95 mole) in ethanol. The solution is stored at 4° C. overnight, and then hydrogenated at 60° C. and 1000 p.s.i. using 4 tsp. of Raney nickel. The catalyst is filtered off and the volatile components distilled off, at water vacuum and steam temperature. The red colored residual oil is dissolved in 300 ml. of anhydrous ether, and at 4° C., is treated with carbon dioxide until no further precipitation occurs. The white amorphous precipitate is filtered off, washed with ether, dissolved in ethanol, and alcoholic hydrogen chloride added to pH 2. The solution is taken to dryness and the residue crystallized from ethanol-ethyl acetate to give 60 g. of 4-[2-(benzylmethylamino)-1-methylethoxy]benzylamine dihydrochloride, melting point 235–236° C.

To 10.7 g. (0.03 mole) of 4-[2-(benzylmethylamino)-1-methylethoxy]benzylamine dihydrochloride dissolved in 50 ml. of water is added 15 percent sodium hydroxide to pH 12. The oil that forms is extracted into ether. The ether extract is washed with water, dried over anhydrous sodium sulfate and the volatile components distilled off. The residual oil is treated according to the procedure of Example 1 with 3,4-diethoxybenzoyl chloride, derived from 7.4 g. of 3,4-diethoxybenzoic acid in 150 ml. of acetonitrile to give 12 g. of N-{4-[2-(benzylmethylamino - 1 - methylethoxy]benzyl} - 3,4 - diethoxybenzamide, melting point 89–90° C. (from ether-petroleum ether). Hydrogenation of the latter as the hydrochloride salt using palladium-on-carbon catalyst gives N-[4-(2-methylamino-1-methylethoxy)benzyl] - 3,4 - diethoxybenzamide hydrochloride, melting point 178–180° (from ethanol-ether). The crystalline free base obtained as described above, melts 56–58° (from ethyl acetate-ether-petroleum ether).

EXAMPLE 12

Preparation of N-[4-(2-ethylamino-1(and 2)-methylethoxy)benzyl]-3,4-diethoxybenzamide hydrochloride To a solution of 29 g. (0.5 mole) of propylene oxide in 50 ml. of water is added 67.5 g. (0.5 mole) of N-benzyl-N-ethylamine. The resulting turbid mixture is vigorously stirred at 50° C. for ½ hour, then at 25° C. for 20 hours. Two layers form. The mixture is fractionally distilled to give 89.3 g. of 1-benzylethylaminopropan-2-ol; $b_{1.5}$ 75–82° C., $n_D{}^{26}$ 1.5085, colorless oil.

65.4 g. (0.34 mole) of 1-benzylethylaminopropan-2-ol in 300 ml. of chloroform, previously saturated with hydrogen chloride is treated with 32 ml. (52.5 g., 0.45 mole) of thionyl chloride at 4° C. over one hour. After stirring at 4° C. for an additional 3 hours, the volatile components are distilled off at water vacuum and steam temperature. The residual oil is crystallized from ethyl acetate-ether to give 54 g. of N-benzyl-2-chloro-N-ethylpropylamine hydrochloride, melting point 105–106° C.

31.5 g. (0.1 mole) of 3,4-diethoxy-N-(4-hydroxybenzyl)-benzamide in 600 ml. of chlorobenzene and 24 ml. of a 25 percent solution (by weight) of sodium methoxide in methanol (equivalent to 0.105 mole of sodium methoxide) is reacted with N-benzyl-2-chloro-N-ethylpropylamine, obtained from 24.8 g. (0.1 mole) of the corresponding hydrochloride by the procedure of Example 4 to give 33 g. of N-{4-[2-(benzylethylamino)-1

(and 2) - methylethoxy]benzyl}-3,4-diethoxybenzamide, melting point 57–58° C. (from ether-petroleum ether).

15 g. (0.03 mole) of N-{4-[2-(benzylethylamino)-1 (and 2)-methylethoxy]benzyl}-3,4-diethoxybenzamide as its hydrochloride is reduced with hydrogen and palladium-on-carbon according to the procedure of Example 1 to give 10 g. of N-{4-[2-(ethylamino)-1(and 2)-methylethoxy]benzyl} - 3,4 - diethoxybenzamide hydrochloride which exist in two crystalline forms of melting point 110–113° C. and 145–147° C. (from acetone ether or acetonitrile-ether).

We claim:

1. A compound of the formula

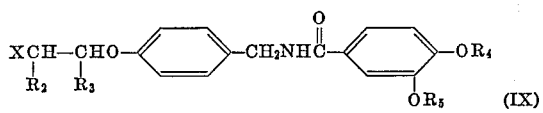

wherein $R_4$ and $R_5$ are lower alkyl of 1 to 7 carbon atoms; $R_2$ and $R_3$ are selected from the group consisting of hydrogen and lower alkyl of 1 to 7 carbon atoms, except that at least one of $R_2$ and $R_3$ must be hydrogen; and X is a halogen atom selected from the group consisting of chlorine, bromine and iodine.

2. A compound according to claim 1, wherein $R_2$ and $R_3$ are hydrogen.

3. A compound according to claim 2, wherein $R_4$ and $R_5$ are ethyl.

References Cited

UNITED STATES PATENTS 3,083,140   1963   Testa et al. _____ 260—559

HENRY R. JILES, Primary Examiner

H. I. MOATZ, Assistant Examiner

U.S. Cl. X.R.

260—456, 471, 561, 570.9; 424—324